(12) United States Patent
Koerber et al.

(10) Patent No.: US 10,462,453 B2
(45) Date of Patent: Oct. 29, 2019

(54) DISPLAY DEVICE AND DISPLAY CONTROL METHOD

(71) Applicant: KONINKLIJKE PHILIPS N.V., Eindhoven (NL)

(72) Inventors: Achim Gerhard Rolf Koerber, Eindhoven (NL); Bart Kroon, Eindhoven (NL); Mark Thomas Johnson, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/774,726

(22) PCT Filed: Nov. 10, 2016

(86) PCT No.: PCT/EP2016/077245
§ 371 (c)(1),
(2) Date: May 9, 2018

(87) PCT Pub. No.: WO2017/081139
PCT Pub. Date: May 18, 2017

(65) Prior Publication Data
US 2018/0324413 A1    Nov. 8, 2018

(30) Foreign Application Priority Data

Nov. 10, 2015 (EP) .................................... 15193804

(51) Int. Cl.
*G09G 5/36* (2006.01)
*H04N 13/354* (2018.01)
(Continued)

(52) U.S. Cl.
CPC ............. *H04N 13/354* (2018.05); *G02B 5/20* (2013.01); *G02B 5/3025* (2013.01);
(Continued)

(58) Field of Classification Search
CPC . G02B 5/20; G02B 5/201; G02B 5/26; G02B 5/3025; G02B 5/3083; G02B 27/22;
(Continued)

(56) References Cited

U.S. PATENT DOCUMENTS 5,825,436 A    10/1998  Knight
5,852,512 A  * 12/1998  Chikazawa ........ G02B 27/2214
                                                              359/463
(Continued)

FOREIGN PATENT DOCUMENTS

GB          2405544 A       3/2005
WO      2008032248 A1       3/2008

*Primary Examiner* — Joe H Cheng

(57) ABSTRACT

A display device comprises a display panel (24), a light blocking arrangement for selectively blocking light which is directed to a lateral output direction from the display panel and an array of lenses (27). The display has a privacy mode in which the light blocking arrangement blocks laterally directed light output from the display device and a public mode in which the light blocking arrangement allows light to pass which is directed to a lateral output direction. The light blocking arrangement comprises a stack of layers (80), each layer comprising a pattern of light blocking arrangement portions of two different types (90,92) such that in the stack of layers, the portions align to form light blocking members, each light blocking member being aligned with an respective lens. The repeating pattern of the light blocking members has a pitch which is double the lens pitch. This enables the light blocking arrangement to be manufactured more easily.

17 Claims, 11 Drawing Sheets

(51) Int. Cl.
| | |
|---|---|
| *G02B 6/00* | (2006.01) |
| *G02F 1/00* | (2006.01) |
| *G02B 27/22* | (2018.01) |
| *H04N 13/305* | (2018.01) |
| *H04N 13/359* | (2018.01) |
| *H04N 13/351* | (2018.01) |
| *G02B 5/20* | (2006.01) |
| *G02B 5/30* | (2006.01) |
| *G02F 1/13* | (2006.01) |
| *G02F 1/13363* | (2006.01) |
| *H04N 13/315* | (2018.01) |
| *H04N 13/30* | (2018.01) |
| *G02F 1/1335* | (2006.01) |

(52) U.S. Cl.
CPC .............. *G02B 5/3083* (2013.01); *G02B 6/00* (2013.01); *G02B 27/2214* (2013.01); *G02F 1/00* (2013.01); *G02F 1/1323* (2013.01); *G02F 1/13363* (2013.01); *H04N 13/305* (2018.05); *H04N 13/351* (2018.05); *H04N 13/359* (2018.05); *G02F 1/133526* (2013.01); *H04N 13/315* (2018.05); *H04N 2013/403* (2018.05); *H04N 2013/405* (2018.05)

(58) Field of Classification Search
CPC .. G02B 27/2214; G02B 27/26; G02B 27/285; G02F 1/00; G02F 1/04; G02F 1/163; G02F 1/1323; G02F 1/133526; G02F 1/133528; G02F 1/13363; H04N 13/305; H04N 13/315; H04N 13/359; H04N 2013/403; H04N 2013/405
See application file for complete search history.

(56) References Cited

U.S. PATENT DOCUMENTS

| | | | | |
|---|---|---|---|---|
| 5,956,001 A * | 9/1999 | Sumida | .............. | G02B 27/2214 345/55 |
| 6,069,650 A * | 5/2000 | Battersby | ........... | G02B 27/2214 348/59 |
| 6,252,707 B1 | 6/2001 | Kleinberger et al. | | |
| 6,703,989 B1 * | 3/2004 | Harrold | .............. | G02B 27/2214 345/32 |
| 7,365,707 B2 | 4/2008 | Schobben et al. | | |
| 7,623,090 B2 | 11/2009 | Ijzerman et al. | | |
| 7,986,375 B2 | 7/2011 | Krijn et al. | | |
| 8,013,944 B2 | 9/2011 | Roosendaal et al. | | |
| 8,045,069 B2 | 10/2011 | Ijzerman et al. | | |
| 8,132,927 B2 | 3/2012 | Redert et al. | | |
| 8,240,854 B2 | 8/2012 | Krijn et al. | | |
| 8,330,881 B2 | 12/2012 | Krijn et al. | | |
| 8,493,440 B2 | 7/2013 | Krijn et al. | | |
| 8,885,018 B2 * | 11/2014 | Smith | ................ | G02B 27/2214 348/42 |
| 9,407,906 B2 * | 8/2016 | Kroon | ................ | G02B 27/2214 |
| 9,451,243 B2 * | 9/2016 | Kroon | .................. | G02B 27/225 |
| 2006/0126156 A1 | 6/2006 | Evans et al. | | |
| 2007/0247590 A1 * | 10/2007 | Schwerdtner | ........ | H04N 13/305 353/7 |
| 2007/0285775 A1 | 12/2007 | Lesage et al. | | |
| 2008/0273148 A1 * | 11/2008 | Yoon | ................ | G02F 1/133512 349/110 |
| 2010/0328440 A1 * | 12/2010 | Willemsen | ......... | G02B 27/2214 348/59 |
| 2011/0018860 A1 * | 1/2011 | Parry-Jones | ......... | G09G 3/20 345/214 |
| 2011/0157264 A1 * | 6/2011 | Seshadri | .................. | G06F 3/14 345/698 |
| 2011/0159929 A1 * | 6/2011 | Karaoguz | .......... | H04N 21/4312 455/566 |
| 2011/0234605 A1 * | 9/2011 | Smith | ................ | G02B 27/2214 345/522 |
| 2012/0162763 A1 * | 6/2012 | Son | .................... | G02B 27/2214 359/463 |
| 2014/0002897 A1 * | 1/2014 | Krijn | .................. | G02B 27/2214 359/463 |
| 2014/0078274 A1 * | 3/2014 | Kroon | .................. | H04N 13/305 348/59 |
| 2014/0111855 A1 * | 4/2014 | Johnson | ............. | G02B 27/2214 359/463 |
| 2015/0138457 A1 | 5/2015 | Kroon | | |
| 2015/0172640 A1 * | 6/2015 | Johnson | ................ | G02B 27/22 348/59 |
| 2015/0301342 A1 * | 10/2015 | Johnson | ................ | H04N 13/305 345/419 |
| 2017/0019543 A1 * | 1/2017 | Cho | ................ | H04N 1/00129 |
| 2018/0359461 A1 * | 12/2018 | Koerber | ................ | G02B 27/00 |

* cited by examiner mode and a public mode. It relates particularly but not exclusively to an autostereoscopic display device with a display panel having an array of display pixels for producing a display and an imaging arrangement for directing different views to different spatial positions.

DISPLAY DEVICE AND DISPLAY CONTROL METHOD

CROSS-REFERENCE TO PRIOR APPLICATIONS

This application is the U.S. National Phase application under 35 U.S.C. § 371 of International Application No. PCT/EP2016/077245, filed on Nov. 10, 2016, which claims the benefit of EP Patent Application No. EP 15193804.0, filed on Nov. 10, 2015. These applications are hereby incorporated by reference herein.

FIELD OF THE INVENTION

This invention relates to a display device which is able to provide a privacy mode and a public mode. It relates particularly but not exclusively to an autostereoscopic display device with a display panel having an array of display pixels for producing a display and an imaging arrangement for directing different views to different spatial positions.

BACKGROUND OF THE INVENTION

A first example of an imaging arrangement for use in an autostereoscopic display device of this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceives a stereo image in his/her eyes all the time.

The barrier arrangement is simple to produce but is not light efficient. A preferred alternative is therefore to use a lens arrangement as the imaging arrangement. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular elements are provided as a sheet of elements, each of which comprises an elongate partial-cylindrical (e.g. semi-cylindrical) lens element. The lenticular elements extend generally in the column direction of the display panel, with each lenticular element overlying a respective group of two or more adjacent columns of display sub-pixels.

The display panel for example comprises a two-dimensional liquid crystal display panel having a row and column array of display pixels (wherein a "pixel" typically comprises a set of "sub-pixels", and a "sub-pixel" is the smallest individually addressable, single-color, picture element). The sub-pixels together act as an image forming means to produce a display.

In an arrangement in which, for example, each lenticule is associated with two columns of display sub-pixels, the display sub-pixels in each column provide a vertical slice of a respective two dimensional sub-image. The lenticular sheet directs these two slices, and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display sub-pixels in the row direction. Corresponding columns of display sub-pixels in each group are arranged appropriately to provide a vertical slice from a respective two dimensional sub-image. As a user's head is moved from left to right, a series of successive, different, stereoscopic views are perceived creating, for example, a look-around impression.

Increasing the number of views improves the 3D impression but reduces the image resolution as perceived by the viewer, since all views are displayed at the same time by the native display. A compromise is typically found whereby a number of views (such as 9 or 15) are displayed in so-called viewing cones, and these viewing cones repeat across the field of view. The end result is a display with a large viewing angle, although viewers are not entirely free in choosing their location from which to view the 3D monitor or television: at the boundaries between viewing cones the 3D effect is absent and ghost images appear. This wide viewing angle is a problem in situations where the user of the display would prefer no eavesdropping on all or certain parts of the display content. One typical example is reading of mail and documents during commutes.

It has been proposed to provide a display with private and public viewing modes. This has also been proposed for 3D autostereoscopic displays, for example in WO 2013/179190.

This document discloses a lens-based autostereoscopic display device, in which a light blocking arrangement is provided between adjacent lens locations and the display is configurable in at least two different modes: a privacy mode in which the light blocking arrangement blocks light which is directed between the lenses; and a public mode in which the light blocking arrangement does not block the light which is directed between the lenses.

The switchable privacy mode is able to turn on and off cone repetition. With cone repetition, the display functions exactly like a regular lens-based autostereoscopic display, with a wide viewing angle similar to a regular 3D lenticular display. Without cone repetition (because of the blocking function between lenses), only the primary cone is visible and all other cones appear black. In the privacy mode, the output brightness to the desired viewing cone is not reduced, and the full display resolution is used.

The 3D lenticular display may also be switchable between a 2D and 3D mode, either because the lens is electro-optically switchable or because the lens is birefringent and the polarization of the display panel can be controlled. Especially when the light modulation by the light blocking arrangement is not based on polarization, the two functions can be independent and there can be four combined modes (2D private, 2D public, 3D private and 3D public).

The light blocking structures are however potentially difficult to manufacture, as they are vertical structures.

There is therefore a need for a light blocking arrangement for implementing public and privacy modes which can be implemented with low cost and low complexity.

SUMMARY OF THE INVENTION

According to the invention, there is provided a display and method as defined in the independent claims.

In one aspect, the invention provides a display device comprising:

a display panel;

a light blocking arrangement for selectively blocking light which is directed to a lateral output direction from the display panel;

an array of lenses arranged in front of the display panel, wherein the display is configurable in a privacy mode in which the light blocking arrangement blocks laterally directed light output from the display device based on the polarization of the light and a public mode in which the light blocking arrangement allows light to pass which is directed to a lateral output direction, wherein the light blocking arrangement comprises a stack of layers, each layer comprising a pattern of light blocking arrangement portions of two different types such that in the stack of layers, the portions align to form light blocking members of two different types, wherein each light blocking member is associated with an associated lens such that the light blocking members form a pattern with a pitch which is double the lens pitch.

This device design enables generally upright light blocking structures to be formed as a stack of layers. This simplifies the manufacture of the device.

The light blocking members may prevent a display output being seen from large lateral angles. For example the light blocking arrangement may block that light having a lateral emission angle centered around the normal direction of more than 60 degrees (i.e. >30 degrees each side of the normal), or more than 40 degrees (i.e. >20 degrees each side of the normal), or more than 20 degrees (i.e. >10 degrees each side of the normal). A narrower range of output angles represents greater privacy. Thus, by "blocks laterally directed light" is meant that light in a direction with an angle laterally away from the normal which is greater than a threshold is blocked. This angle will depend on the height of the light blocking members (i.e. the dimension in the normal direction) and their lateral spacing. They may be considered to form light tubes.

The generally upright light blocking members may be offset from the normal direction to the display panel. Thus, they are then not perfectly upright. This offset for example is used to taper the light tubes formed by the light blocking members to provide a focus at a desired viewing distance.

The stack of layers may comprise 3 or 4 layers. A greater number of layers will approximate more closely to a solid upright structure but it will increase manufacturing complexity. A small number of layers requires the patterns in each layer to be larger so that the lateral light is blocked. This means the design becomes less optically efficient. It has been found that 3 of 4 layers in the stack provides the best compromise between optical efficiency and manufacturability.

The display device comprises an array of lenses arranged in front of the display panel, wherein the light blocking arrangement is for selectively blocking light which is directed between the lenses.

The lenses enable the display to be an autostereoscopic display, with the additional capability of a privacy mode.

The light blocking arrangement portions of the pattern are of two different types such that in the stack of layers, the portions align to form light blocking members of two different types. One type of light blocking member allows light of one type (i.e. polarization) to pass and blocks another type (i.e. polarization). This means that light with a correct polarization pattern can be provided through all of the light blocking members at the same time so that there is reduced light loss. It means that the light blocking members can be large, i.e. with a width corresponding to the lens width, and this in turn means that a small number of layers may be used to form the light blocking members.

In one arrangement, each layer of the light blocking arrangement comprises an alternate arrangement of fixed polarizers and switchable polarizers or polarization rotators.

For a display panel which delivers a polarized output, the polarization rotators may be used to create an alternating polarization pattern (for the privacy mode) or else create a uniform pattern (for the public mode). The switchable polarizers then enable a particular polarization to be blocked or allowed to pass. They enable the alternating polarization pattern to reach the display output with blocking of light laterally between the light blocking members.

The layer nearest the display panel for example comprises the alternate arrangement of fixed polarizers and polarization rotators whereas the other layers comprise an alternate arrangement of fixed polarizers and switchable polarizers.

In another arrangement, all layers of the light blocking arrangement apart from one comprise an alternate arrangement of fixed polarizers, with alternating polarization direction, and the other layer comprises an array of switchable polarization rotators.

In this design, the switchable polarization rotators enable two opposite polarization patterns to be created. One (first) pattern is able to reach the display output in a normal direction because of the fixed polarizers, with blocking of light laterally between the light blocking members. The other (second) pattern can only reach the display output in a lateral direction. For a wide viewing angle public mode, the first and second patterns may be time-alternated whereas for a privacy mode only the first pattern is used.

This design means only one switchable layer is needed. In one switch state, light for a primary viewing cone is able to pass, and the secondary viewing cones are blocked. In the other switch state, light for the primary viewing cone is blocked, and light for the secondary viewing cones is able to pass. In this case, a time sequential operation may be used to provide a public viewing mode of primary and secondary cones.

The patterns may be striped patterns. Different areas of the display can also be set to different modes.

Examples in accordance with another example of the invention provide a method of manufacturing a display device, comprising:

providing a display panel;

forming a light blocking arrangement for selectively blocking light which is directed to a lateral output direction from the display panel based on the polarization of the light;

mounting the light blocking arrangement over the display panel; and providing an array of lenses in front of the display panel, wherein forming the light blocking arrangement comprises forming a stack of layers, each layer comprising a pattern of light blocking arrangement portions of two different types such that in the stack of layers, the portions align to form light blocking members of two different types, wherein each light blocking member is associated with an associated lens such that the light blocking members form a pattern with a pitch which is double the lens pitch.

This method enables generally upright structures to be formed in sequential layer process.

The invention also provides a method of controlling a display device as defined above (in which each layer of the light blocking arrangement comprises an alternate arrangement of fixed polarizers and switchable polarizers or polarization rotators), wherein the method comprises controlling the switchable polarizers or polarization rotators so that the layer either functions as a uniform polarizer for a public mode, or as a striped polarizer for a privacy mode.

The invention also provides a method of controlling a display device as defined above (in which all layers of the light blocking arrangement apart from one comprise an alternate arrangement of fixed polarizers, with alternating polarization direction, and the other layer comprises an array of switchable polarization rotators) wherein the method comprises controlling the switchable polarization rotators in one switch state so that light for a primary viewing cone is able to pass to the display output and the secondary viewing cones are blocked, and controlling the switchable polarization rotators in another switch state in which light for the primary viewing cone is blocked, and light for the secondary viewing cones is able to pass to the display output.

This means a time sequential operation may be used to provide the public viewing mode.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides a display device comprising a display panel and a light blocking arrangement for selectively blocking light which is directed to a lateral output direction from the display panel. The display has a privacy mode in which the light blocking arrangement blocks laterally directed light output from the display device and a public mode in which the light blocking arrangement allows light to pass which is directed to a lateral output direction. The light blocking arrangement comprises a stack of layers, each layer comprising a pattern of light blocking arrangement portions such that in the stack of layers, the portions align to form upright light blocking members. This enables the light blocking arrangement to be manufactured more easily.

The invention will be described with reference to an autostereoscopic display device, but it can be used generally to provide a private and a public viewing mode.

Figure 1:
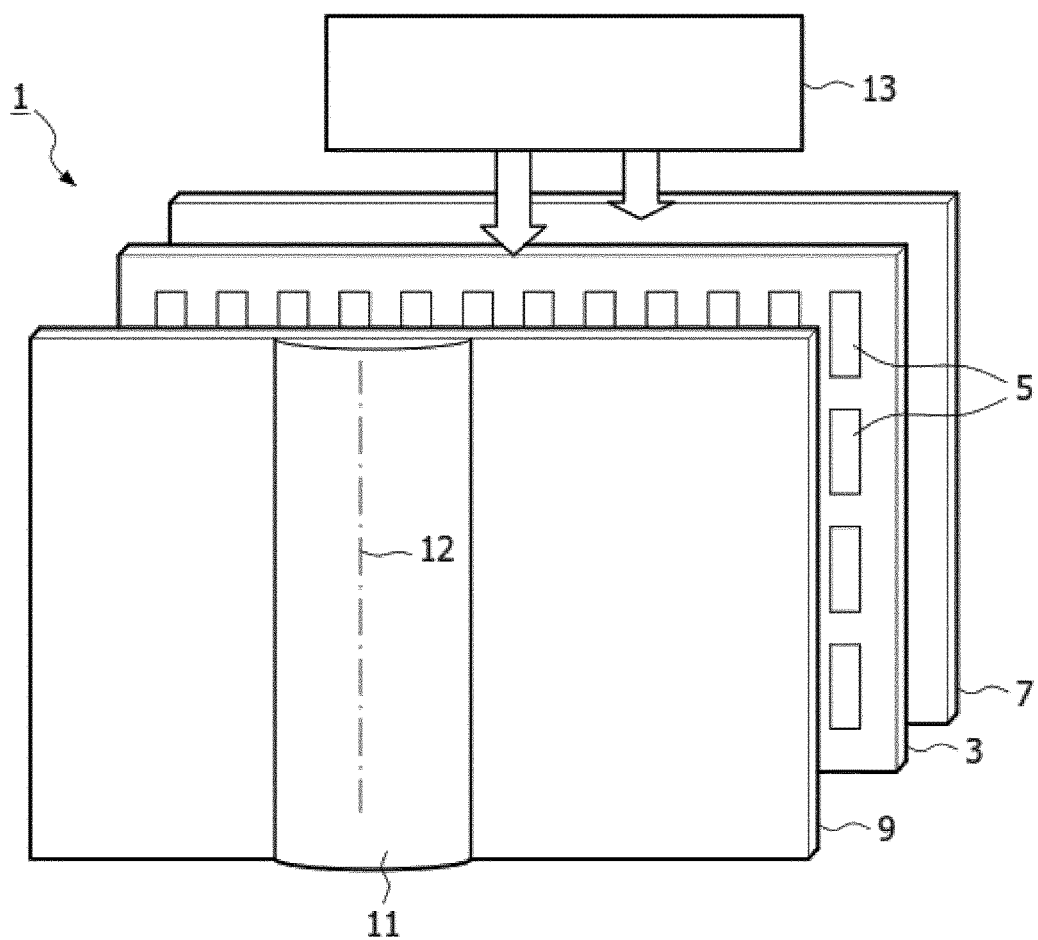
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display sub-pixels 5 arranged in rows and columns. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed.

A full color pixel may have red (R) green (G) and blue (B) sub-pixels possibly augmented with a white sub-pixel or with one or more other elementary colored sub-pixels. For example, an RGB (red, green, blue) sub-pixel array is well known, although other sub-pixel configurations are known such as RGBW (red, green, blue, white) or RGBY (red, green, blue, yellow).

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material therebetween. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display sub-pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display sub-pixel array. Light from the light source 7 is directed through the display panel 3, with the individual display sub-pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The device has a controller 13 which controls the backlight and the display panel.

The autostereoscopic display device 1 shown in FIG. 1 is capable of providing several different perspective views in different directions. In particular, each lenticular element 11 overlies a small group of display sub-pixels 5 in each row. The lenticular element 11 projects each display sub-pixel 5 of a group in a different direction, so as to form the several different views. As the user's head moves from left to right, his/her eyes will receive different ones of the several views, in turn.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the imaging arrangement of the device.

Figure 2:
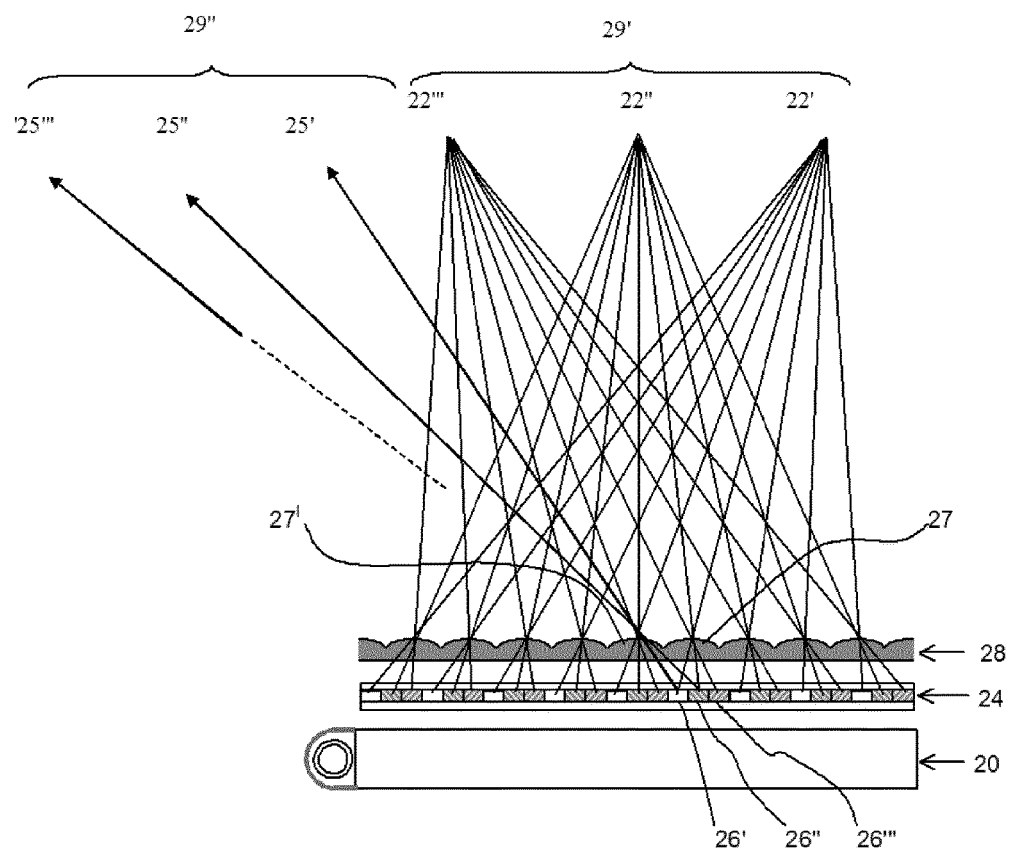
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28 of lenses 27. FIG. 2 shows how the lenticular arrangement 28 directs different pixel outputs to three different spatial locations.

When applied to an autostereoscopic display, the invention relates to view repetition in such displays, which is explained below.

Figure 3:
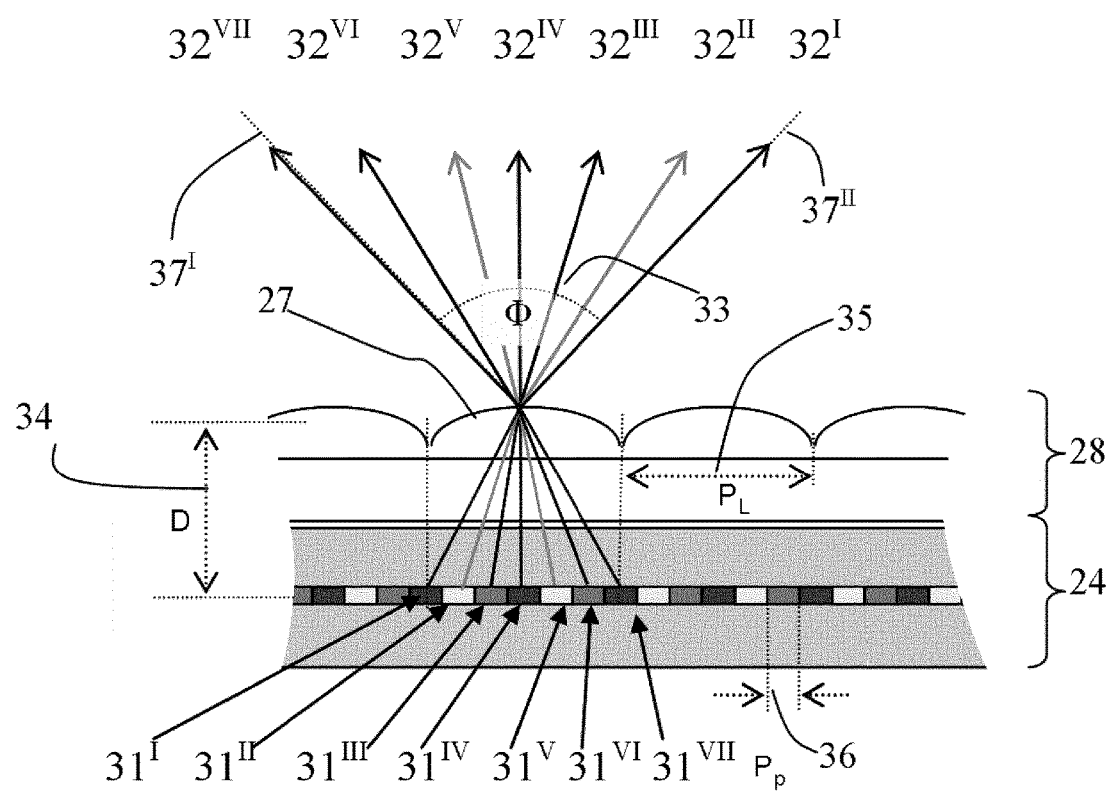
FIG. 3 shows a cross-section of the layout of a multi-view auto-stereoscopic display.

FIG. 3 shows a cross-section of the layout of a multi-view auto-stereoscopic display. Each sub-pixel $31^I$ to $31^{VII}$ underneath a certain lenticular lens 27 will contribute to a specific view $32^I$ to $32^{VII}$. All sub-pixels underneath this lens will together contribute to a cone of views. The width of this cone (between lines 37' and 37") is determined by the combination of several parameters: it depends on the distance 34 (D) from the pixel plane to the plane of the lenticular lenses. It also depends on the lens pitch 35 ($P_L$).

Figure 4:
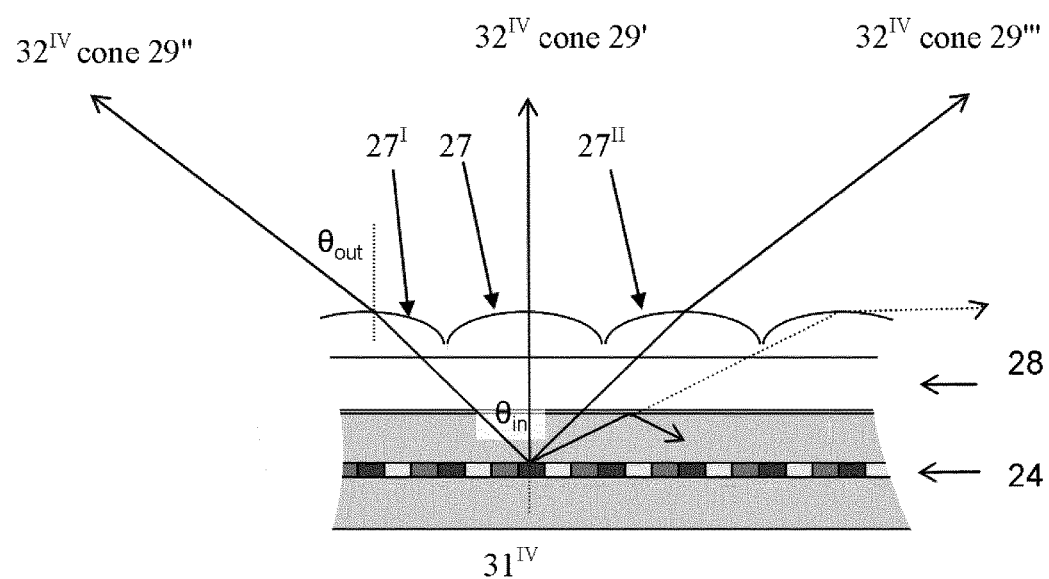
FIG. 4 is a close-up of FIG. 3.

FIG. 4 is a close-up of FIG. 3, and shows that the light emitted (or modulated) by a pixel of the display 24 is collected by the lenticular lens 27 closest to the pixel but also by neighboring lenses 27' and 27" of the lenticular arrangement 28. This is the origin of the occurrence of repeated cones of views. Pixel $31^{IV}$ for example contributes to viewing cones 29', 29" and 29"' as shown.

Figure 5:
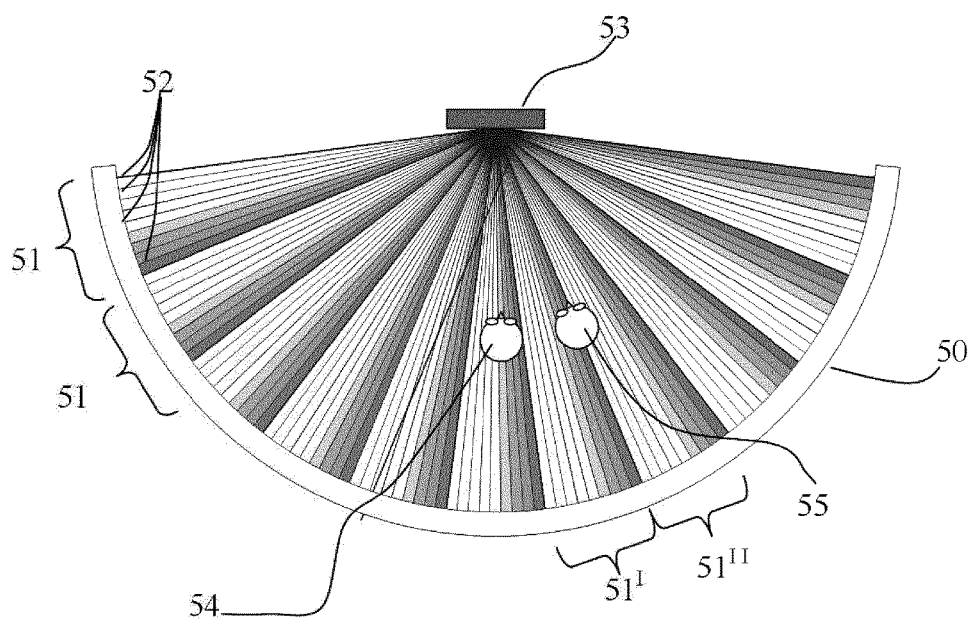
FIG. 5 shows a 9-view system in which the views produced in each of the sets of cones are equal.

The corresponding views produced in each of the cones are equal. This effect is schematically shown in FIG. 5 for a 9-view system (i.e. 9 views in each cone).

For an acceptable compromise between 3D effect and resolution penalty, the total number of views is limited to typically 9 or 15. These views have an angular width of typically 1 to 2 degrees. The views and the cones have the property that they are periodic.

Figure 6:
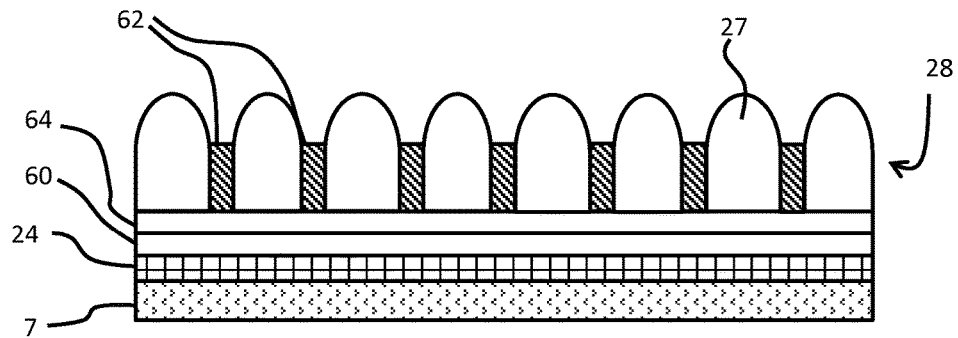
FIG. 6 shows an example of display device as disclosed in WO2013/179190.

FIG. 6 shows one example arrangement of WO 2013/179190 in which light blocking elements 62 are provided between the lenses. The arrangement as a whole (not necessarily the parts between the lenses) can be switched to a light transmitting or blocking mode. In this way, light from a pixel that would leave the display from a neighboring lens can be blocked while the primary viewing cone is unaltered. The system can be implemented as optical elements between the lenticules and additional layers which provide the control of the light entering/leaving the lenticular lenses so that the light blocking function is enabled or disabled.

Examples of possible light blocking arrangement disclosed in WO2013/179191 are:

(i) The light blocking structure is a polarizer, and the optical path includes at least one retarder.

(ii) The light blocking structure is a retarder and the optical path includes a polarizer.

(iii) The light blocking structure is an electrophoretic cell.

FIG. 6 is based on the use of a polarizer as the light blocking element. A first polarizer 60 is provided between the display panel 24 and the lenticular array 28. An arrangement of second polarizers 62 is provided between the lens elements. An optical retarder 64 is provided between the polarizers 60, 62.

The lenticular sheet can be manufactured by embossing the lenticular sheet and filling it with material that, when dry, has a polarizing function. An alternative is to produce lenticular and polarizing strips separately and then glue them together to form a lenticular sheet. That sheet can then be placed on top of the other display layers.

The retarder 64 can for example be a single liquid crystal cell covered on both sides with a single transparent (for example ITO) electrode, such that the retarder as a whole can be switched between polarity states. Alternatively the retarder 64 can be patterned such that an LC cell covers a single sub-pixel, pixel or set of pixels. In that case cells can be switched independently. This allows for content, task or application privacy modes such that sensitive information on the display (for example mail) is only visible in a small viewing cone, while insensitive information is not.

Figure 7:
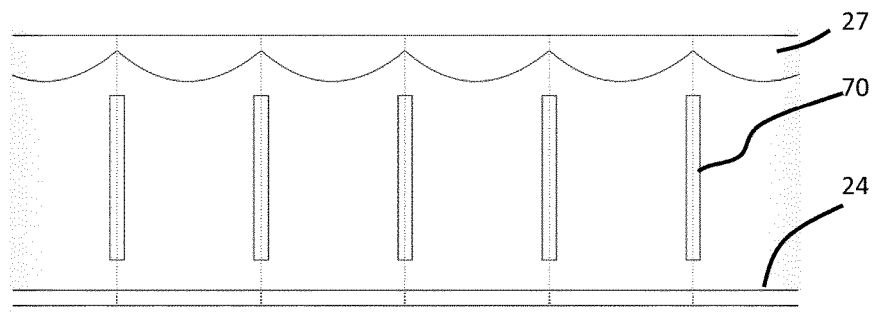
FIG. 7 shows the general design of the light blocking elements of the prior art.

FIG. 7 shows the general design of the known light blocking arrangement. It has a set of columns 70 over the display panel 24 with the lenses 27 above the columns 70. Note that FIG. 7 also shows a design of the lenses 27 which, instead of facing away from the display panel (i.e. convex when viewed from the display panel, and concave when viewed from the display output), has curvature in the opposite direction with a solid-solid refractive index interface instead of a solid-air interface. Either configuration is possible.

Figure 8:
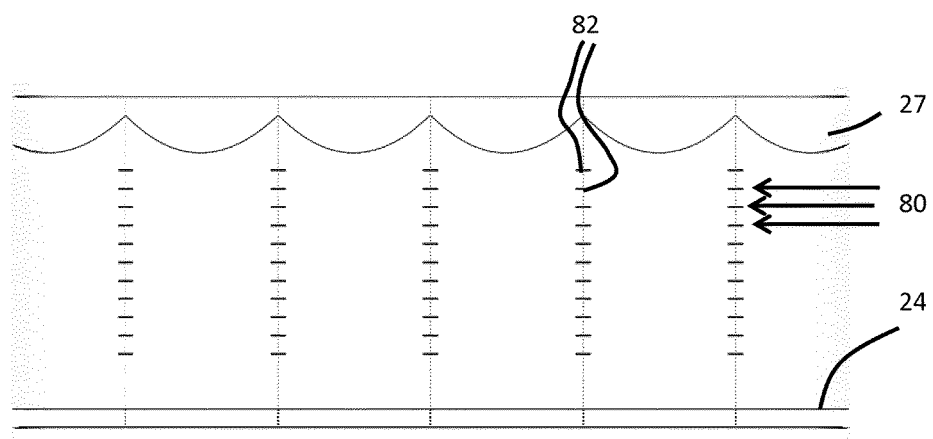
FIG. 8 shows the general design of the light blocking elements of examples in accordance with the invention.

FIG. 8 shows the general design of the light blocking arrangement used in examples in accordance with the invention. It comprises a stack of layers 80, each layer 80 comprising a pattern 82 of light blocking arrangement portions such that in the stack of layers, the portions align to form upright light blocking members.

In this way, vertical or near vertical structures are formed from many thin layers. The layers 80 may be on either or both sides of the lens array. Only those on the viewer side of the lens add to the total thickness of the display.

As in the known system described above, the display panel provides light output in either one of two orthogonal polarization states, in a controllable manner. One example is to have a display module comprising a display panel with polarized output (e.g. an LCD display) and a switchable retarder.

To produce the lens spacer, strips of polarizer material may be added to each layer of transparent material, for example by depositing metal wires.

If there are many layers, the process becomes complicated because the layers have to be aligned and laminated. One simpler approach is to use a roll to roll process whereby individual rolls are laminated to form thicker rolls.

An alternative is to use additive manufacturing, such as 3D printing, of the lens stack. For example, additive manufacture of optical components is known based on flowing UV-curable acrylic ink.

In such an additive process, instead of producing thin layers of glass or plastic as sheets or rolls, a substrate such as a first layer of regular spacer glass, or even the display panel, is used as the starting template. Flat layers of transparent material are then repeatedly added, with strips of polarizer deposited on top. The lenticular lens itself may be directly formed on top of the spacer using further additive manufacturing or it may be manufactured according to a separate process and laminated to the spacer. More layers are added if there are to be layers on both sides of the lens array.

Whatever manufacturing technique is used, the general manufacturing method involves providing a display panel, forming a light blocking arrangement for selectively blocking light which is directed to a lateral output direction from the display panel, and mounting the light blocking arrangement over the display panel. This mounting may be part of the manufacturing process of the light blocking structure itself, or it may be a separate step post-manufacture of the light blocking structure Forming the light blocking arrangement comprises forming a stack of layers, each layer comprising a pattern of light blocking arrangement portions such that in the stack of layers, the portions align to form upright light blocking members.

It will not be possible to make the polarizer strips fully transparent (e.g. only 90%) for the polarization state which is to be passed. To compensate for the light loss in the polarizer portions, a similar polarization-independent loss may be provided between the polarizer portions. In this way, the polarizer pattern has the same transparency for light of the polarization able to pass through as the transparency of the transparent layer to that light. This ensures that the public mode has a uniform appearance.

The pitch of the stripe pattern of each individual layer 80 may be adjusted to correct for the viewing distance. Thus, the light blocking arrangements function as light tubes, but they converge slightly to focus at a designed viewing distance from the display. As a result, upright light blocking members are offset from the normal direction to the display panel. This offset may be small, for example less than 5 degrees, and it will be opposite at opposite sides of the display and zero in the center.

The pitch will be slightly larger than the lens pitch, and depend on the optical distance of the layer 80 to the lens, in comparison to the viewing distance. Apart from this small correction of the pitch, the layers are aligned.

FIG. 8 shows a design with a large number of layers 80. Although it is feasible to manufacture such a display, it would be better in terms of optical quality and/or manufacturability if the display would have only a small number of patterned layers 80.

Figure 9:
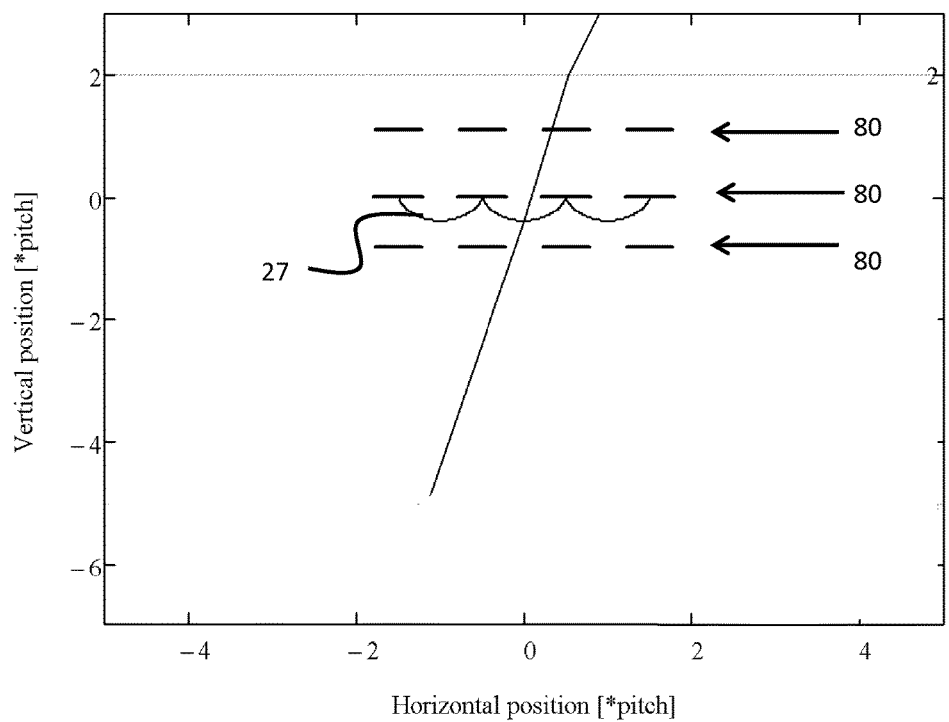
FIG. 9 shows the optical behavior of a first arrangement based on FIG. 8.

FIG. 9 shows a design with only three layers 80. With fewer layers 80, the polarizer patterns have to be wider to prevent light leakage and this results in a reduced intensity in the privacy mode. This might be acceptable because modern displays can be made very bright (e.g. 1000 cd/m$^2$) but for mobile applications this has an impact on battery life. Furthermore, FIG. 9 shows the lenticules 27.

Figure 10:
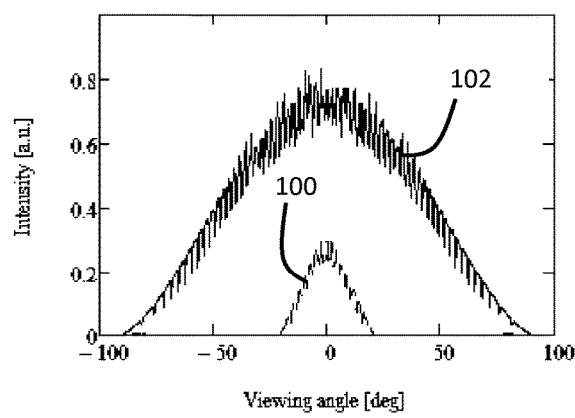
FIG. 10 shows the intensity at the output of the arrangement of FIG. 8 in the two modes of operation.

FIG. 10 shows a simulated result of such a solution with only three layers.

It shows the overall effect on the light output intensity (y-axis) as a function of viewing angle (x-axis). Plot 100 is for the privacy mode and plot 102 is for the public mode.

Light which is directed normally from a display pixel will pass through the center of a lenticular lens and reach a central viewing location without attenuation. However, some light which would reach that central viewing location from the edges of the lenticular will be blocked by the polarizer layers.

Thus, the cause of the intensity reduction is that half of the surface of the polarizer pattern extends into the light path of the primary cone. With many layers this is less of a problem because each of the layers can have small area polarizers, but when the number of layers is reduced, the surface has to be increased to avoid light leakage (traversing the gaps between patterns in the layer stacking direction) and this results in more light loss in the primary cone.

As a result, for a given cone angle there is an optimal compromise between the manufacturing difficulty of the number of layers and the optical efficiency. More layers give a smaller area of material needed, so a larger optical window for the central viewing cone, but they are more difficult to make.

In simulations, it has been demonstrated that the minimum number of layers is three and a preferred number is typically three or four depending on the overall design.

The use of polarization to provide selective light blocking is not the only option. As an alternative to polarizer strips and a switchable retarder, full light modulators maybe applied, i.e. display panel technologies. In the public mode the light modulators may be configured to pass all light. In the privacy mode they form the strips, by forming a light blocking pattern. In this case there is light loss if the light modulator cannot be fully transparent. Thus, it is advantageous to use a light modulator with a high transparency and aperture. One example is an electrophoretic light modulator.

As explained above, the cause of the intensity reduction in the primary cone is that half of the surface of the optical pattern extends into the light path.

The invention provides designs which address this issue, by having light blocking arrangement portions of two different types. In this way, light blocking members of two different types are formed, wherein each light blocking member is associated with an associated lens. This means the light blocking members form a pattern (where members of different types are considered to be different elements of the pattern) with a pitch which is double the lens pitch.

One type of light blocking member allows light of one type (i.e. polarization) to pass and blocks another type (i.e. polarization). This means that light of the correct type can be provided through all of the light blocking members at the same time so that there is reduced light loss. It means that the light blocking members can be large, i.e. with a width corresponding to the lens width, and this in turn means that a small number of layers may be used to form the light blocking members.

Some approaches based on this approach are shown in FIGS. 11 to 14. The same reference numerals are used as in FIG. 10. In all cases, the pattern of the light blocking members of each particular type has double the pitch of the lenses (ignoring viewing distance correction explained above). This means there is one sub-set of lenses each aligned with a respective first type of light blocking member and another sub-set of lenses each aligned with a respective space between a pair of that type of light blocking member, and at which the other type of light blocking member is present. Each layer thus has two types of light blocking elements (i.e. of opposite polarization), which together cover the full area. The overall pattern, or else the pattern for one particular type of light blocking member has a pattern. In all examples of this concept, the repeating pattern has a pitch which is double the lens pitch.

Figure 11:
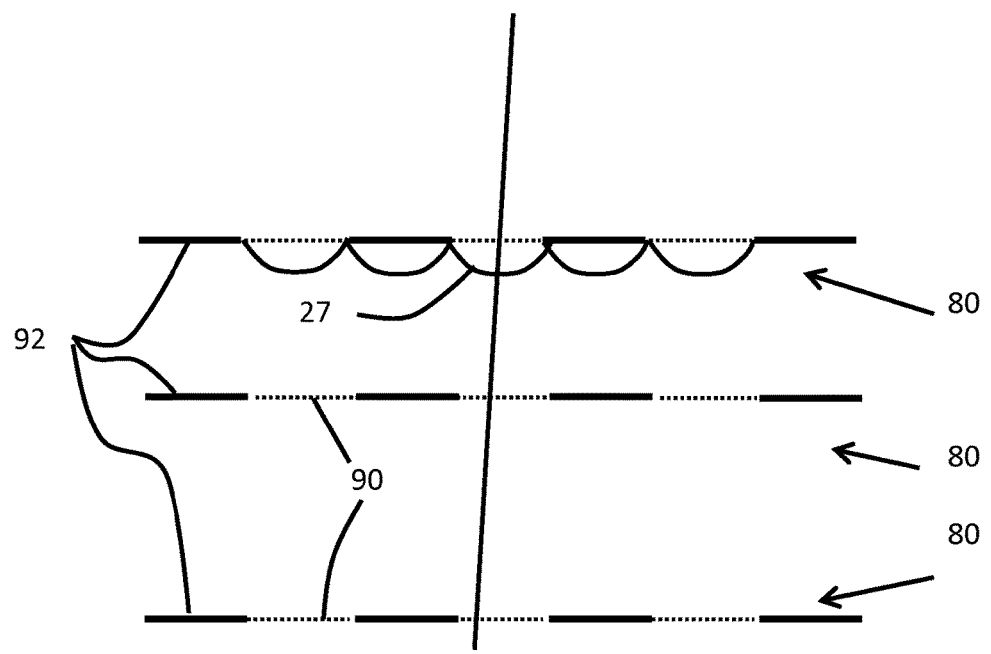
FIG. 11 shows the optical behavior of a second arrangement.

A first implementation is shown in FIG. 11.

Each polarizer layer 80 comprises fixed polarizers 90 (shown dotted) and switchable polarization rotators 92 (shown solid). The fixed and switchable polarizers are alternated so they form stripes which correspond to the lens stripes. Assuming that the output of the display panel is polarized, then the element 92 close to the display panel is a switchable polarization rotator. The other elements 92 are rotatable polarizers (elements that block one polarization, but selectable which polarization they block).

The display panel outputs polarized light.

In the public mode, the polarized light passes through all layers. The switchable elements 92 in the layer nearest the display panel do not implement a polarization rotation so that the same polarization of light is present everywhere. The switchable polarizers 92 are oriented parallel to the fixed polarizers 90 in the top two layers, and they all pass the polarization of light output by the display panel. Apart from some absorption due to active layers (e.g. ITO is not very transparent), there is no effect of those layers.

In the privacy mode for half of the lenses (e.g. all odd ones), at the display panel the polarization is rotated by the rotators 92, and then at the other layers 80 the rotation is switched for the same half of lenses, such that a situation is created where light that travels within the confines of a lenticule has one polarization and that polarization is not blocked, while neighboring lenticules block that polarization. The privacy mode is obtained when the switchable polarizers 92 are oriented perpendicularly to the fixed polarizers 90 in the top two layers. This means light of a given polarization (i.e. as at the output of the display) can only pass through one set of polarizers, thus creating the desired striped light blocking function in each of the layers.

As such, the panel has full resolution in both public and privacy mode, and apart from some light loss and complexity due to the active layers, both public and privacy mode are basically artifact-free. The fixed polarizers 90 block light that is used in the neighboring columns. This design creates a public mode with a wide viewing angle. In the privacy mode, columns of alternating polarization are created to remove the secondary viewing cones.

In the privacy mode, because a lens is aligned with a space between the light blocking members the intensity of the primary viewing cone, seen in the privacy mode, is improved.

Figure 12:
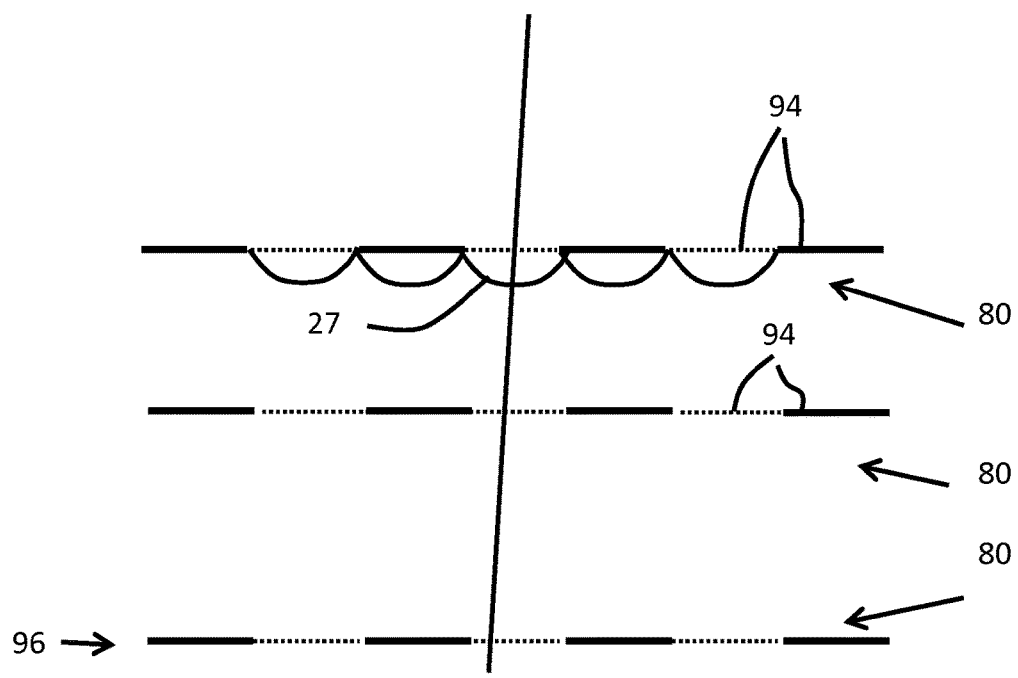
FIG. 12 shows the optical behavior of a third arrangement in a privacy mode.
Figure 12:
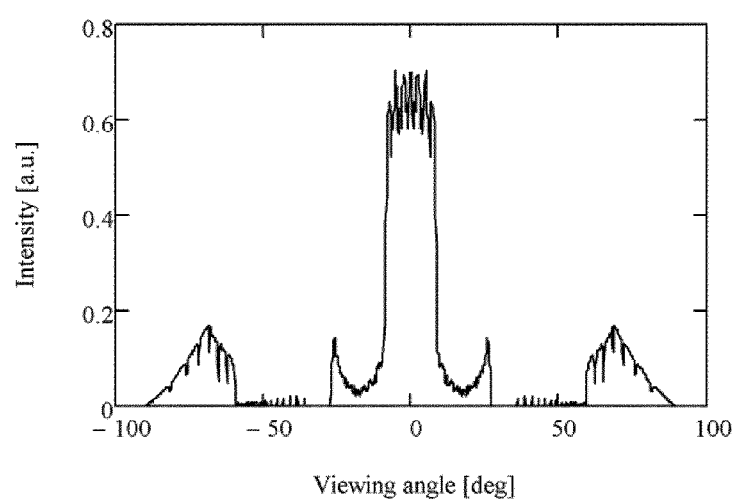
Figure 13:
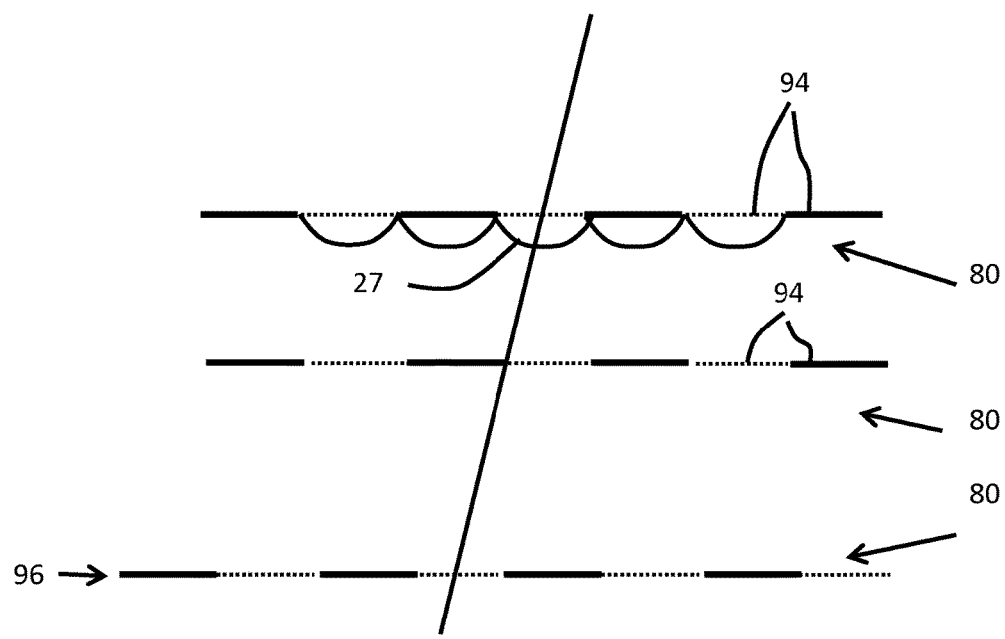
FIG. 13 shows the optical behavior of the third arrangement in one sub-frame of the public mode (the other sub-mode being the privacy mode of FIG. 12)
Figure 13:
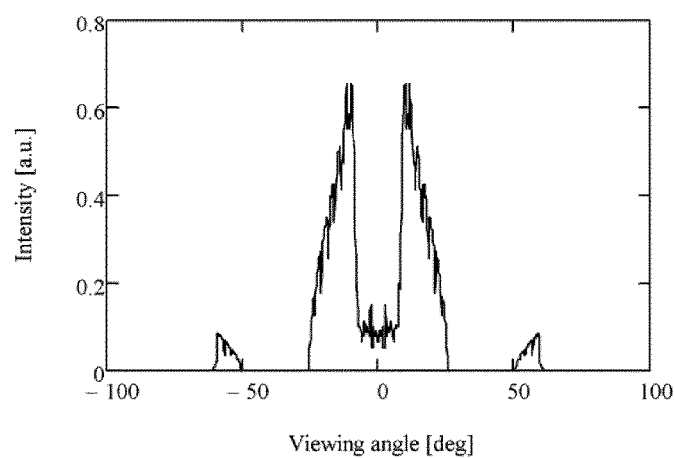
Figure 14:
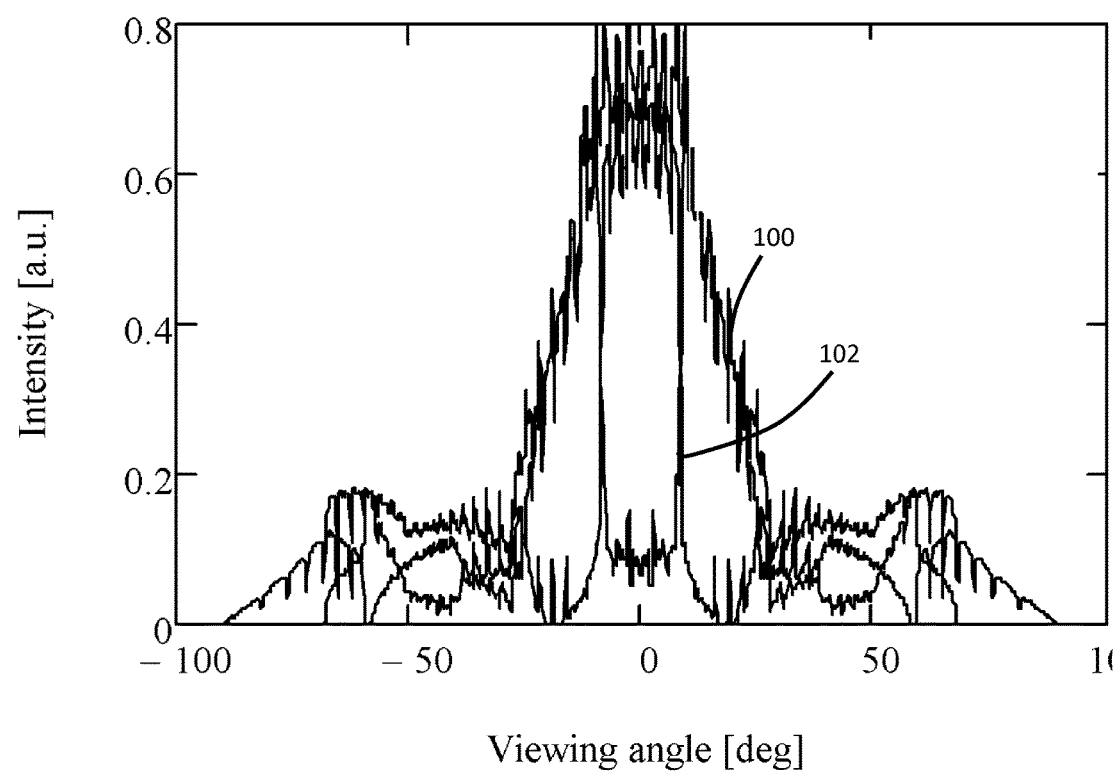
FIG. 14 shows the intensity performance for the third arrangement in the public mode.

A second implementation is shown in FIGS. 12 to 14. The upper two layers have fixed polarizers 94 but with alternating polarization direction (one polarization direction shown solid and one shown dotted). In the lowest layer which is directly on the display panel a switchable polarization rotator 96 is provided having an array of polarization rotators. This layer is able to produce two opposite patterns. One pattern has stripes of alternating polarizations, and the other pattern is the opposite stripe arrangement. Thus, the whole layer is switchable, but it is patterned, with the pattern having a pitch of two lenses (i.e. one stripe of the lens width having one polarization at its output and another stripe of the lens width having the opposite polarization at its output.

The polarization pattern at the output of the layer 96 then alternates in successive frames. Again, the display panel is assumed to have a polarized output.

In the privacy mode shown in FIG. 12, the switchable rotators in layer 96 are held in the polarization state indicated, wherein the dotted portions allow the same polarization to pass as the dotted portions of the two fixed layers 80 above. This configuration functions in exactly the same way as FIG. 11, in which portions which allow the same polarization to pass are arranged in stacked columns. Thus, there are alternating columns of opposite polarization. Thus, vertical light blocking members are defined. FIG. 12 also shows the light output intensity as a function of viewing angle, and it shows that the primary viewing cone is dominant.

The display panel may have an angularly limited light output (for example by making a backlight output limited in its range of emission angles) such that the light from the light output regions of the display panel does not reach the lens two to the left or right (compared to the lens normally above the light output region). The polarization arrangement is then used to block light immediately laterally to the sides of the normal direction and the backlight design is used to prevent light reaching further laterally offset viewing angles.

In the public mode, the portions 96 are switched between the two polarization patterns in a time-sequential manner. As a consequence, the viewing angle is broadened from about one cone (the privacy mode) to about 3 cones. The second time-sequential operation is shown in FIG. 13, wherein now the lowest layer blocks the main viewing cone. This 3 cone width is still quite narrow for a public mode, but technologically much more simple to implement than having all layers switchable.

FIG. 13 also shows the light output intensity as a function of viewing angle, and it shows that the primary viewing cone is blocked.

FIG. 14 shows the combination of the intensity plots from FIGS. 12 and 13, and thus shows the difference between the public mode 100 and the privacy mode 102.

Time-sequential operation requires fast light modulation (e.g. blue phase or fringe field switching (FFS) LC material) which draws power and may cause visible flicker. As an alternative, one of the two sub-frames could be shown continuously, such that the privacy mode has half the resolution of the public mode. In this case a more transparent light modulator can be selected for the optical selector, such as based on electrophoretic technology.

The controllable layers in the examples above may be controlled at the level of the entire display, so that the complete display is switched between modes. However, it is also possible to define different display areas by controlling locally the configurations of the polarization rotators and controllers.

The two examples above are able to preserve the full display resolution in both the privacy and public modes. There are more simple implementations if resolution can be sacrificed. For example, a single polarizer switch can be provided at the display panel and then all the switchable rotators 90 in FIG. 11 may just be arranged as transparent openings between fixed polarizers. In the privacy mode, the display output for half of the lenses is blocked by the fixed polarizers and in the public mode the display output can pass everywhere. This arrangement will have full resolution in the public mode, but in private mode only half of the lenses would output light. This would generate a stripe pattern that might be visible to the user if the lenses are not small enough. It can be seen that this comes at the expense of the resolution in the privacy mode. For example, only one of two sub-frames may be displayed.

As mentioned above, one example of backlight makes use of LEDs. This gives good energy efficiency and they can be turned on and off quickly and thereby allow frame-based local dimming in order to improve the black level and power efficiency. Another step is to use RGB LEDs instead of white LEDs with the benefit that the color gamut can be increased. The LEDs can be placed behind the display panel or on the sides of a patterned waveguide to produce a side-lit display.

However, a cold cathode fluorescent lamp ("CCFL") backlight may instead by used, which typically comprises a row of CCFL lamps placed in a cavity lined with a white and diffuse (Lambertian) back. The light from the CCFL lamps either directly or via the back lining passes through a diffuser to hide the lamps and ensure sufficiently uniform screen intensity.

Organic light emitting diodes (OLED), organic light emitting transistors (OLET) and quantum dot LEDs (QLED) may also be used to create backlights as the techniques allow to create a uniformly emitting surface. This removes the need for diffusers and waveguides and thus can reduce the number of components and make the display even thinner. However, to use the full potential of these techniques, the pixels themselves could be emitters to improve the efficiency as explained above with reference to FIG. 8.

A backlight can then be dispensed with for the generation of the image to be displayed if a direct emitting display technology is used.

The invention can be applied to all of these types of display.

The examples above show non-switchable autostereoscopic displays.

By making the lens of a multi-view display switchable, it becomes possible to have a high 2D resolution mode in combination with a 3D mode. Other uses of switchable lenses are to increase the number of views time-sequentially (WO 2007/072330) and to allow multiple 3D modes (WO 2007/072289). Known methods to produce a 2D/3D switchable display replace the lenticular lens by:

(i) A lens shaped cavity filled with liquid crystal material of which the lens function is turned on/off by electrodes that control the orientation of LC molecules or is turned on/off by changing the polarization of the light (through a switchable retarder).

(ii) A box shaped cavity filled with liquid crystal where electrodes control the orientation of LC molecules to create a gradient-index lens (see for instance WO 2007/072330).

(iii) An electro wetting lens of droplets of which the shape is controlled by an electric field.

(iv) A lens-shaped cavity filled with transparent electrophoretic particles in a fluid of different refractive index (WO 2008/032248).

This invention can be applied to switchable autostereoscopic displays, for example of the types outlined above.

The examples above show the use of the invention in an autostereoscopic display. The invention may however be used for a 2D display, to provide private and public viewing modes.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A display device comprising:
    a display panel;
    an array of lenses arranged in front of the display panel, wherein the array of lenses have a lens pitch; and
    a light blocking arrangement arranged between the array of lens and the display panel;
    wherein the display device is configurable in a privacy mode and a public mode,
    wherein the light blocking arrangement blocks laterally directed light output from the display panel device based on the polarization of the light in the privacy mode,
    wherein the light blocking arrangement allows laterally directed light output from the display panel to pass in the public mode,
    wherein the light blocking arrangement comprises a stack of layers, wherein each layer comprises a pattern of light blocking arrangement portions of two different types such that in the stack of layers, the portions align to form light blocking members of two different types,
    wherein each light blocking member is associated with an associated lens such that the light blocking members form a pattern with a blocking pitch, and
    wherein the blocking pitch is double the lens pitch.

2. The display device as claimed in claim 1, wherein each layer of the light blocking arrangement comprises an alternate arrangement of fixed polarizers and switchable polarizers.

3. The display device as claimed in claim 2, wherein a layer nearest the display panel comprises an alternate arrangement of a fixed polarizer and a polarization rotator, and wherein other layers comprise an alternate arrangement of fixed polarizers and switchable polarizers.

4. The display device as claimed in claim 1, wherein a first layer comprises an array of switchable polarization rotators, and wherein other layers comprise an alternate arrangement of fixed polarizers with alternating polarization direction.

5. The display device as claimed in claim 4, wherein the first layer is the layer nearest the display panel.

6. The display device as claimed in claim 4, wherein the switchable polarization rotators are arranged such that in one switch state a light for a primary viewing cone is able to pass to the display output and at least one of a plurality of secondary viewing cones is blocked, and wherein the switchable polarization rotators are arranged such that in another switch state the light for the primary viewing cone is blocked, and the light for at least one of the plurality secondary viewing cones is able to pass to the display output.

7. The display device as claimed in claim 4, wherein each layer of the light blocking arrangement comprises an alternate arrangement of the fixed polarizers and the switchable polarization rotators.

8. The display device as claimed in claim 1, wherein the display panel has a normal direction, and wherein the light blocking members are offset from the normal direction.

9. The display device as claimed in claim 1, wherein the stack of layers comprises 3 or 4 layers.

10. A method of manufacturing a display device, comprising:
    providing a display panel;
    providing an array of lenses in front of the display panel such that at least a portion of the light of the display passed through the array of lenses, wherein the array of lenses have a lens pitch; and
    forming a light blocking arrangement and disposing the light blocking arrangement between the array of lens and the display panel, wherein the light blocking arrangement is configure to selectively blocking light based on the polarization of the light, wherein the blocked light directed to a lateral output direction from the display panel;
    wherein forming the light blocking arrangement comprises forming a stack of layers,
    wherein each layer comprises a pattern of light blocking arrangement portions of two different types,
    wherein the portions align to form light blocking members of two different types, wherein each light blocking member is associated with an associated lens such that the light blocking members form a pattern with a blocking pitch, wherein the blocking pitch is double the lens pitch.

11. The method as claimed in claim 10, wherein the forming of each layer of the light blocking arrangement comprises an alternate arrangement of fixed polarizers and switchable polarizers.

12. The method as claimed in claim 11, wherein a layer nearest the display panel comprises an alternate arrangement of a fixed polarizer and a polarization rotator, and wherein and the other layers comprise an alternate arrangement of fixed polarizers and switchable polarizers.

13. The method as claimed in claim 10, wherein a first layer comprises an array of switchable polarization rotators, and wherein other layers comprise an alternate arrangement of fixed polarizers with alternating polarization direction.

14. The method as claimed in claim 13, wherein the first layer is the layer nearest the display panel.

15. The method as claimed in claim 13, further comprising controlling the switchable polarizers or the switchable polarization rotators so that the layer either functions as a uniform polarizer for a public mode, or as a striped polarizer for a privacy mode.

16. The method as claimed in claim 13, wherein the forming of each layer of the light blocking arrangement comprises an alternate arrangement of the fixed polarizers and the switchable polarization rotators.

17. The method as claimed in claim 10, wherein the stack of layers comprises 3 or 4 layers.

* * * * *